May 4, 1926.

S. A. SANDBERG

UNIVERSAL JOINT

Filed August 15, 1925

1,583,184

Inventor:
Swan A. Sandberg
By Wilson + McCanna
Attys.

Patented May 4, 1926.

1,583,184

UNITED STATES PATENT OFFICE.

SWAN A. SANDBERG, OF LEE CENTER, ILLINOIS.

UNIVERSAL JOINT.

Application filed August 15, 1925. Serial No. 50,388.

*To all whom it may concern:*

Be it known that I, SWAN A. SANDBERG, a citizen of the United States, residing at Lee Center, in the county of Lee and State of Illinois, have invented certain new and useful Improvements in Universal Joints, of which the following is a specification.

This invention relates to universal joints. The primary object of the invention is to provide a universal joint especially designed and adapted for use on farm implements but capable otherwise of general use, which has a convenient provision for tightening and truing-up to take up play resulting from wear.

In accordance with the foregoing object I provide a universal joint comprising a pair of forked knuckle members having connection with a swivel block through the medium of bolts passing through the block at right angles, the arms of the knuckle members being provided with tapered heads arranged to be received in tapered sockets in the swivel block, the heads being arranged to be drawn up in the sockets by the tightening of the bolts, thereby truing-up and eliminating play in the joint.

My invention is illustrated in the accompanying drawing wherein—

Figure 1:
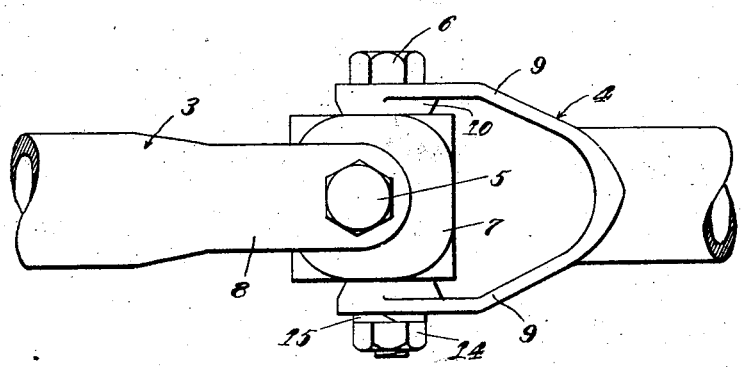
Figure 2:
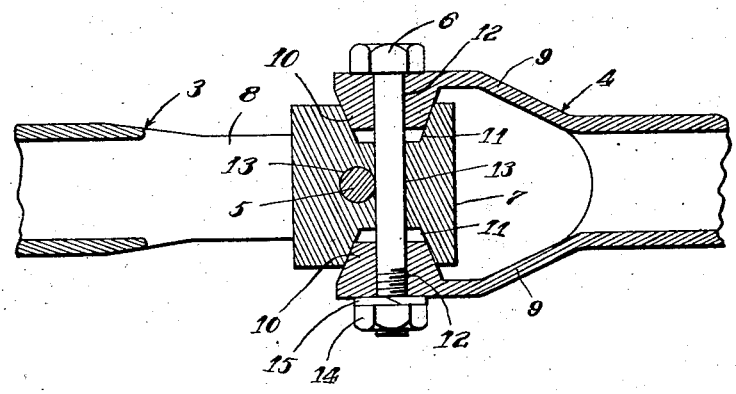

Fig. 1 is a side elevation of a joint constructed in accordance with the invention; and Fig. 2 is a central longitudinal section through the joint.

The universal joint comprises a pair of knuckle members 3 and 4 having connection by means of bolts 5 and 6 with the swivel block 7. The knuckle members may be in the form of separate elements secured to the adjoining ends of two shafts arranged to operate in disalignment or, as I have contemplated, the knuckle members may be integral extensions at adjoining ends of a pair of tubular shafts. These shafts may form a part of an extension steering mechanism from a trailing vehicle to a tractor, but it is intended that the universal joint incorporated in the connection of the shafts is capable of general use wherever it is desired to transmit power from a drive shaft to a driven shaft extending in disalignment. The arms 8 and 9 of the knuckle members 3 and 4 respectively are forged or may otherwise be cast integral with the members, of malleable iron preferably, and have frusto-conical heads 10 provided on their outer ends lying in facing relation as most clearly illustrated in Fig. 2. These heads are made integral with the arms of the knuckles and may be cast, welded or otherwise secured thereon. The heads 10 are received in tapered sockets 11 provided in the swivel block 7. The openings 12 provided in the knuckle members for the reception of the bolts are concentric with the head 10 and sockets 11 and are likewise arranged to register with openings 13 extending at right angles through the swivel block. The bolts 5 and 6 are each provided with an adjusting nut 14 and a lock washer 15 for the purpose of tightening up the joint when assembling or later when taking up play resulting from wear.

The arms of the knuckles 3 and 4 are pliant and may be spread sufficiently to bring the head 10 over the sides of the swivel block 7 for entry in the sockets therein and they may be drawn together to seat the heads in the sockets in the original assembling of the joint, or, likewise, when it is desired to true-up and tighten the joint after a certain amount of wear has produced play. Obviously, the construction provided is extremely simple and inexpensive. Also there are no parts which are apt to be broken and, by virtue of the adjustment feature to compensate for wear, the joint is made to operate smoothly and noiselessly and will give the maximum service.

I claim:

In a joint between two relatively pivoting members, as in a universal joint, one of which members has a forked end portion and the other of which carries a block on the adjacent end thereof to enter within said forked portion, a bolt passing through said fork and block to join the two together, said fork having a pair of cone-shaped heads provided in the form of integral projections on the inside of the arms thereof in facing relation, having central openings therethrough and through said fork arms to receive said bolt substantially in coaxial relation therewith, and said block having an opening therethrough to receive said bolt and having cone-shaped sockets at opposite ends of said opening to accommodate said cone-shaped heads with a close swivel fit, said fork arms being expansible to permit the passing of the projecting heads thereon about the sides of said block and being thereafter arranged, with the heads engaged in the sockets, to be drawn together more and more from time to time by the progressive tightening of said bolt to take up wear on the heads and in said sockets and maintain the desired close swivel fit of the heads in the sockets and thereby eliminate play in the joint.

In witness of the foregoing I affix my signature.

SWAN A. SANDBERG.